United States Patent
Rupp et al.

(10) Patent No.: US 6,194,844 B1
(45) Date of Patent: Feb. 27, 2001

(54) CIRCUIT ARRANGEMENT AND METHOD FOR OPERATING AT LEAST ONE HIGH-PRESSURE DISCHARGE LAMP

(75) Inventors: Arnulf Rupp; Guenther Hirschmann, both of Munich; Gerwin Thiel, Fuerstenfeldbruck, all of (DE)

(73) Assignee: Patent-Treuhand-Gesellschaft fuer elektrische Gluehlampen mbH, Munich (DE)

( * ) Notice: Subject to any disclaimer, the term of this patent is extended or adjusted under 35 U.S.C. 154(b) by 0 days.

(21) Appl. No.: 09/517,073

(22) Filed: Mar. 1, 2000

(30) Foreign Application Priority Data

Mar. 4, 1999 (DE) .............................................. 199 09 530

(51) Int. Cl.[7] .................................................. H05B 37/00
(52) U.S. Cl. ........................ 315/289; 315/290; 315/291; 315/244; 315/278; 315/209 R; 315/DIG. 5
(58) Field of Search ..................................... 315/289, 290, 315/244, 209 R, 276, 239, 360, 278, 218, 291, DIG. 5, DIG. 7

(56) References Cited

U.S. PATENT DOCUMENTS

| | | | | |
|---|---|---|---|---|
| 4,724,360 | * | 2/1988 | Luursema | 315/244 |
| 4,893,061 | * | 1/1990 | Linssen | 315/227 R |
| 5,036,256 | * | 7/1991 | Garrison et al. | 315/308 |
| 5,142,203 | * | 8/1992 | Oda et al. | 315/308 |
| 5,821,696 | * | 10/1998 | Fromm et al. | 315/107 |
| 5,990,633 | * | 11/1999 | Hirschmann et al. | 315/289 |

* cited by examiner

Primary Examiner—Haissa Philogene
(74) Attorney, Agent, or Firm—Carlo S. Bessone

(57) ABSTRACT

A circuit arrangement for operating at least one high-pressure discharge lamp with a high-frequency alternating voltage, the circuit arrangement having a voltage converter (W) with an alternating voltage output (j10, j11), a load circuit which is connected to the alternating voltage output (j10, j11) and which has at least one lamp inductor (L1), a coupling capacitor (C1) and terminals (j12, j13) for at least one high-pressure discharge lamp (LP), and a starter (Z) with a high-voltage source and a high-voltage DC output (j14, j15) for starting a gas discharge in the at least one high-pressure discharge lamp (LP). The coupling capacitor (C1) is connected to the high-voltage DC output (j14, j15) via a charging resistor (R1).

14 Claims, 5 Drawing Sheets

Figure 1:
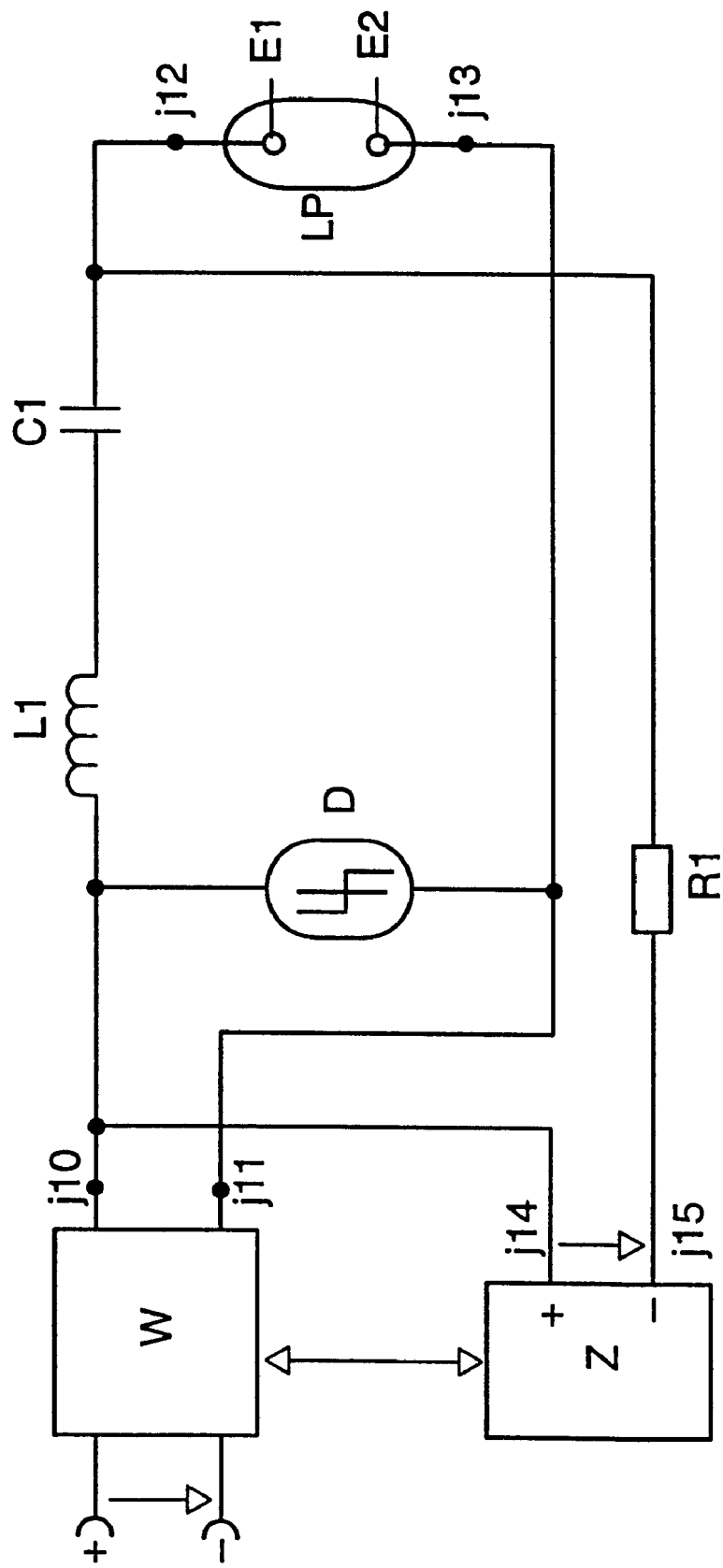

CIRCUIT ARRANGEMENT AND METHOD FOR OPERATING AT LEAST ONE HIGH-PRESSURE DISCHARGE LAMP

The invention relates to a circuit arrangement for operating at least one high-pressure discharge lamp and to an operating method for a high-pressure discharge lamp.

I. BACKGROUND OF THE INVENTION

A circuit arrangement of this type is disclosed for example in the international patent application with the publication number WO 98/18297. This laid-open specification describes a circuit arrangement for the high-frequency operation of a high-pressure discharge lamp, that is to say for operating the high-pressure discharge lamp on an alternating voltage at a frequency above 200 kHz and preferably even above 500 kHz. The circuit arrangement has a voltage converter which generates a high-frequency alternating voltage at its output. The output of this voltage converter is formed by the two secondary windings of a transformer. The first secondary winding is connected into a load circuit which is designed as a series resonant circuit and is provided with the lamp terminals, while the second secondary winding is connected to the voltage input of a starter. The starter is a pulse starter, which applies unipolar high-voltage pulses to the high-pressure discharge lamp during the starting phase by means of an auxiliary starting electrode. In the case of lamp operation with high alternating voltage frequencies of this type, it is difficult to generate the necessary starting voltage for the high-pressure discharge lamp with the aid of a Tesla transformer, since the secondary windings of the transformer must have only a low inductance at such high frequencies—because of their otherwise excessively high internal impedance and the inadequately low transfer of power which results from this.

II. SUMMARY OF THE INVENTION

The object of the invention is to provide a circuit arrangement for operating at least one high-pressure discharge lamp with a high-frequency alternating voltage, which has an improved starter for starting a gas discharge in the at least one high-pressure discharge lamp, and to specify an improved operating and starting method for a high-pressure discharge lamp fed with a high-frequency alternating voltage.

The circuit arrangement according to the invention has a voltage converter for generating a high-frequency alternating voltage at its alternating voltage output, a load circuit which is connected to the alternating voltage output and which has at least one lamp inductor, a coupling capacitor and terminals for at least one high-pressure discharge lamp, and a starter for starting a gas discharge in the at least one high-pressure discharge lamp, the starter being provided with a high-voltage source and a high-voltage DC output. The coupling capacitor is connected to the high-voltage DC output via a charging resistor. As a result of this measure, during the starting phase the coupling capacitor is charged with the high DC voltage generated by the starter and, during the starting phase, serves as a voltage source for the load circuit and in particular for the at least one high-pressure discharge lamp. After the gas discharge has been started in the at least one high-pressure discharge lamp, the coupling capacitor is discharged via the electrically conductive discharge path in the at least one high-pressure discharge lamp. The discharge current flowing via the at least one high-pressure discharge lamp from the coupling capacitor contributes significantly to the production and stabilization of the discharge arc in the at least one high-pressure discharge lamp. In particular, the discharge current flowing through the at least one high-pressure discharge lamp from the coupling capacitor shortens the transition time from the undesired glow discharge, which damages the lamp electrodes, to the arc discharge.

The high-voltage source of the starter is advantageously designed as a cascade circuit for voltage multiplication of the output voltage of the voltage converter, or as a secondary winding coupled inductively to the lamp inductor, possibly with a downstream cascade circuit for voltage multiplication. In order to prevent the voltage converter being destroyed by excessively high starting voltages, a voltage-limiting component is advantageously connected in parallel with the alternating voltage output of the voltage converter. The voltage-limiting components used are advantageously bidirectional diodes, for example Transil diodes, or varistors, because they can be loaded with high electrical outputs.

The load circuit of the voltage converter advantageously also has a resonance capacitor which, with the lamp inductor, forms a series resonant circuit. As a result, the method of resonance enhancement can also be used for providing the discharge arc transfer energy and for generating the operating voltage for the at least one high-pressure discharge lamp. In the particularly preferred exemplary embodiments, the resonance capacitor is connected in parallel with the series circuit comprising the coupling capacitor and the at least one high-pressure discharge lamp. As a result, the starting voltage for the at least one high-pressure discharge lamp is formed from the additive superimposition of the high DC voltage present across the coupling capacitor and the resonance-enhanced high-frequency alternating voltage from the voltage converter, which is present across the resonance capacitor.

The voltage converter is advantageously designed as a single-ended converter or as a push-pull converter, for example as a push-pull inverter. These voltage converters are particularly suitable for converting a comparatively low DC voltage of, for example, 12 V or 24 V, which is usual in motor vehicles, into a high-frequency alternating voltage having an amplitude of about 500 V and a frequency of more than 500 kHz.

III. BRIEF DESCRIPTION OF THE DRAWINGS

Figure 2:
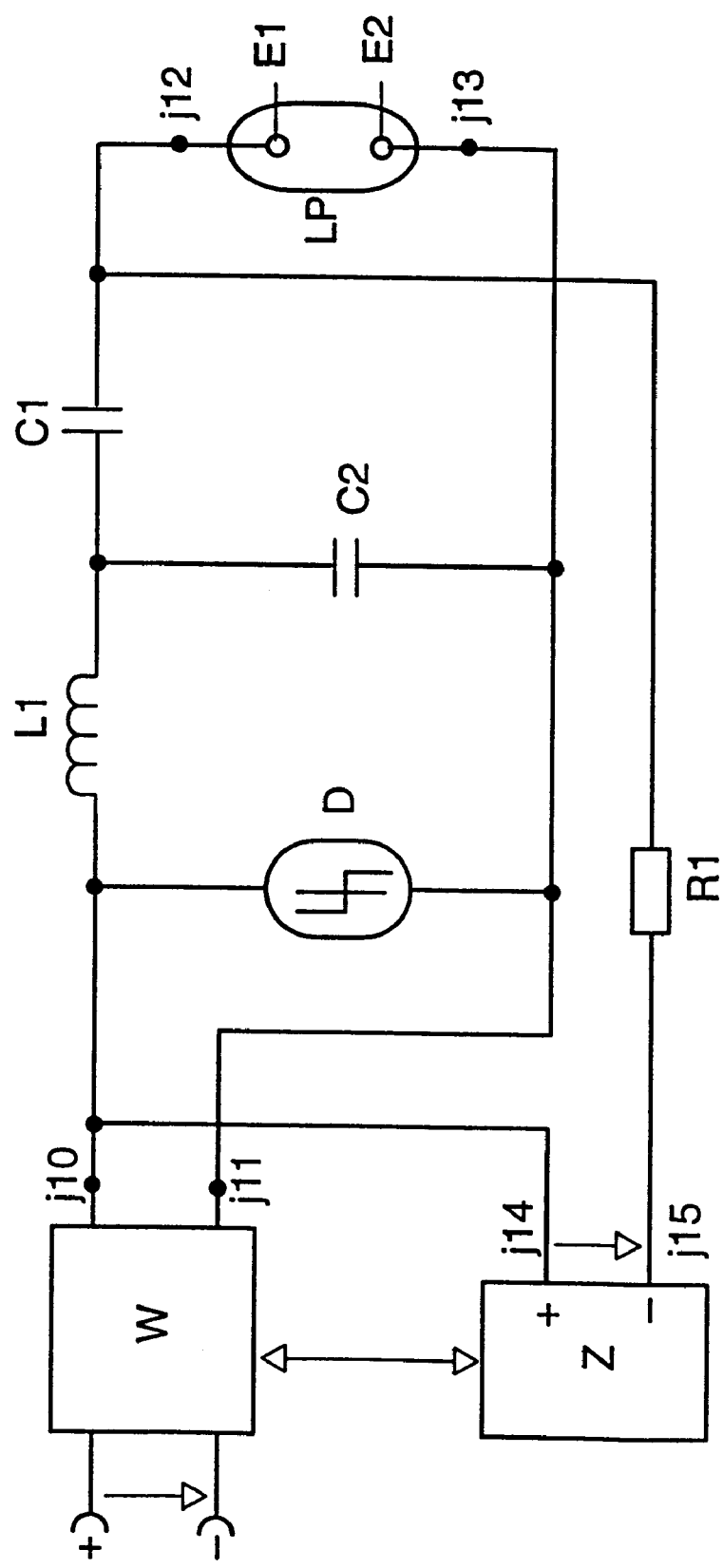
Figure 3:
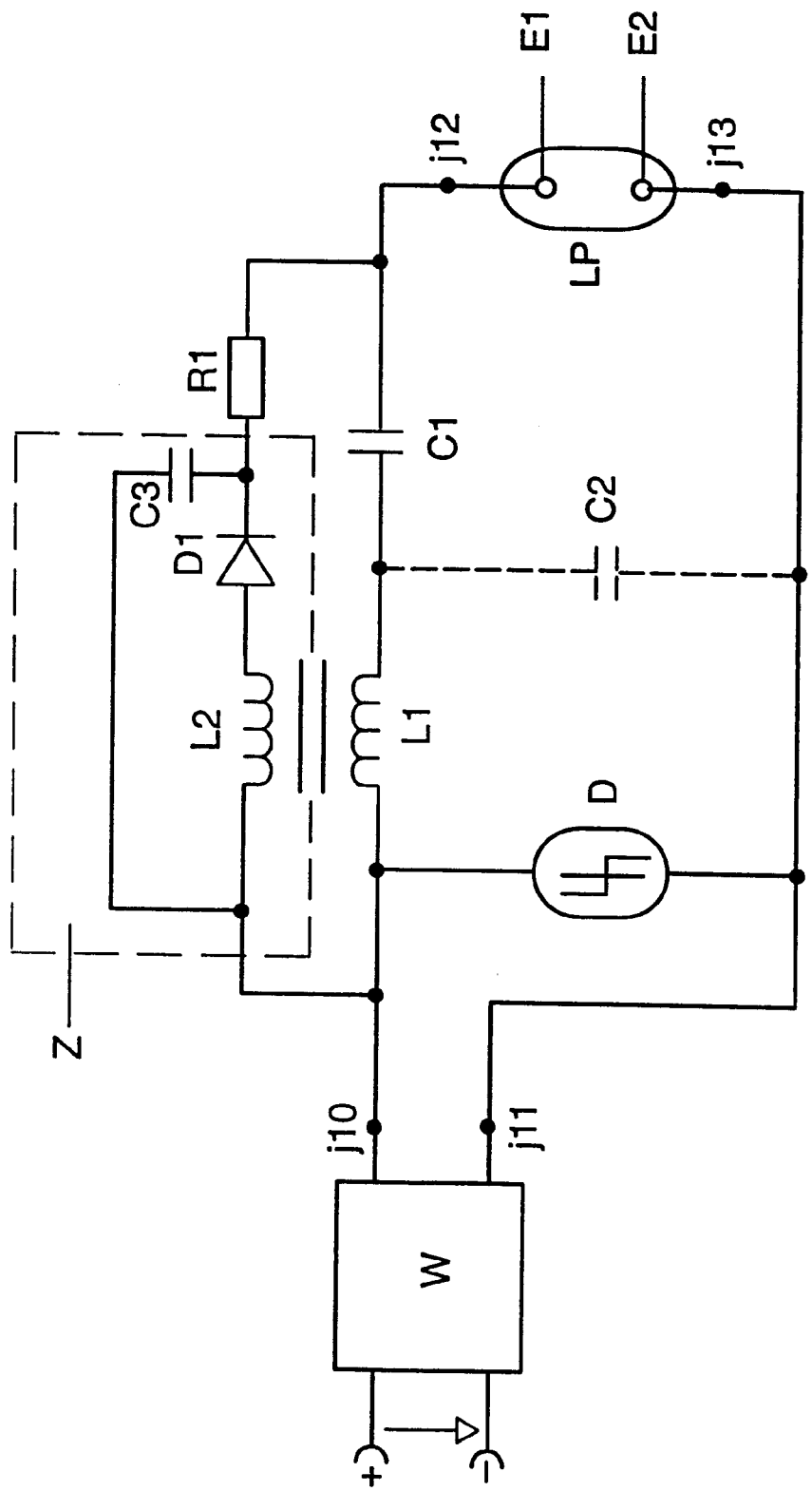
Figure 4:
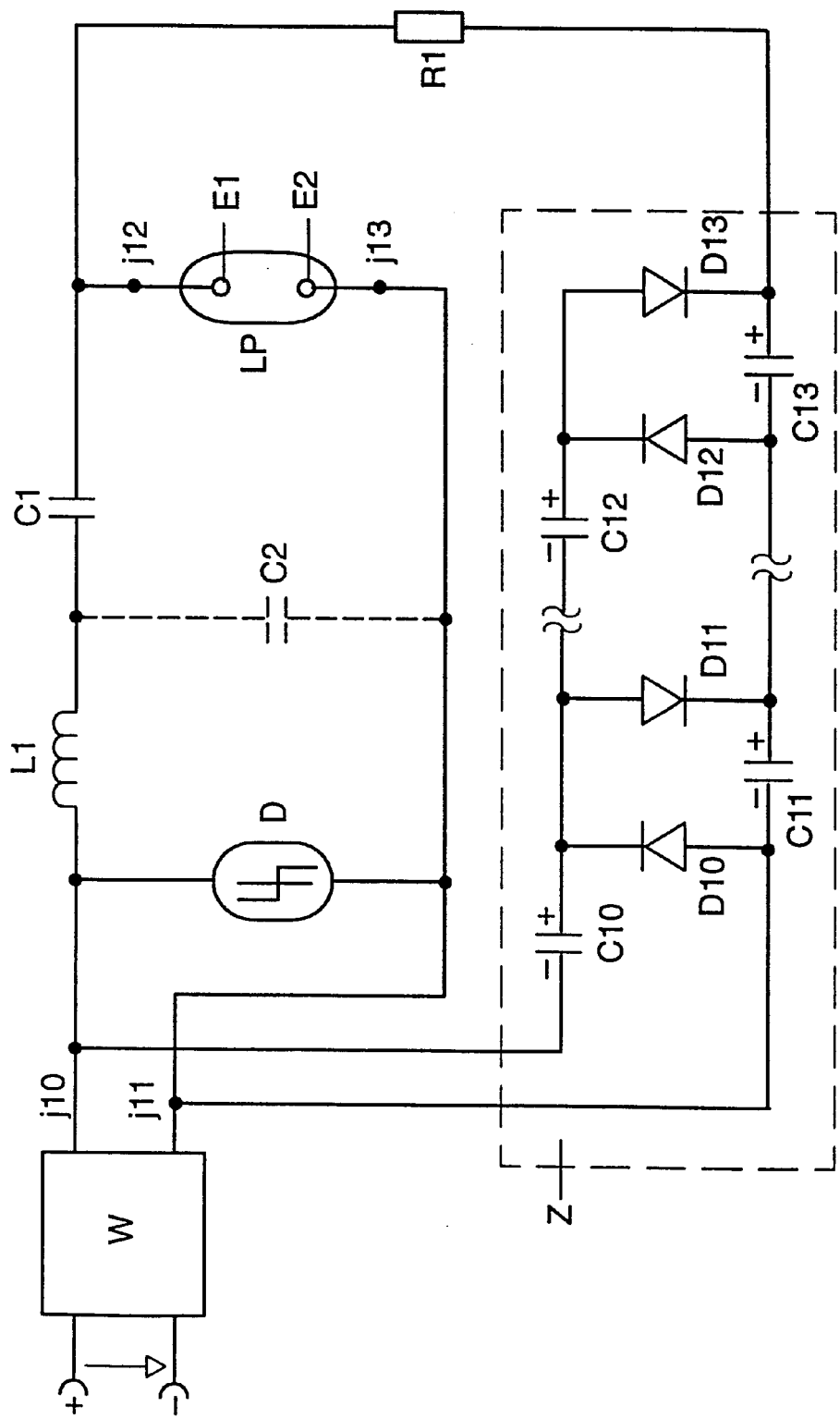
Figure 5:
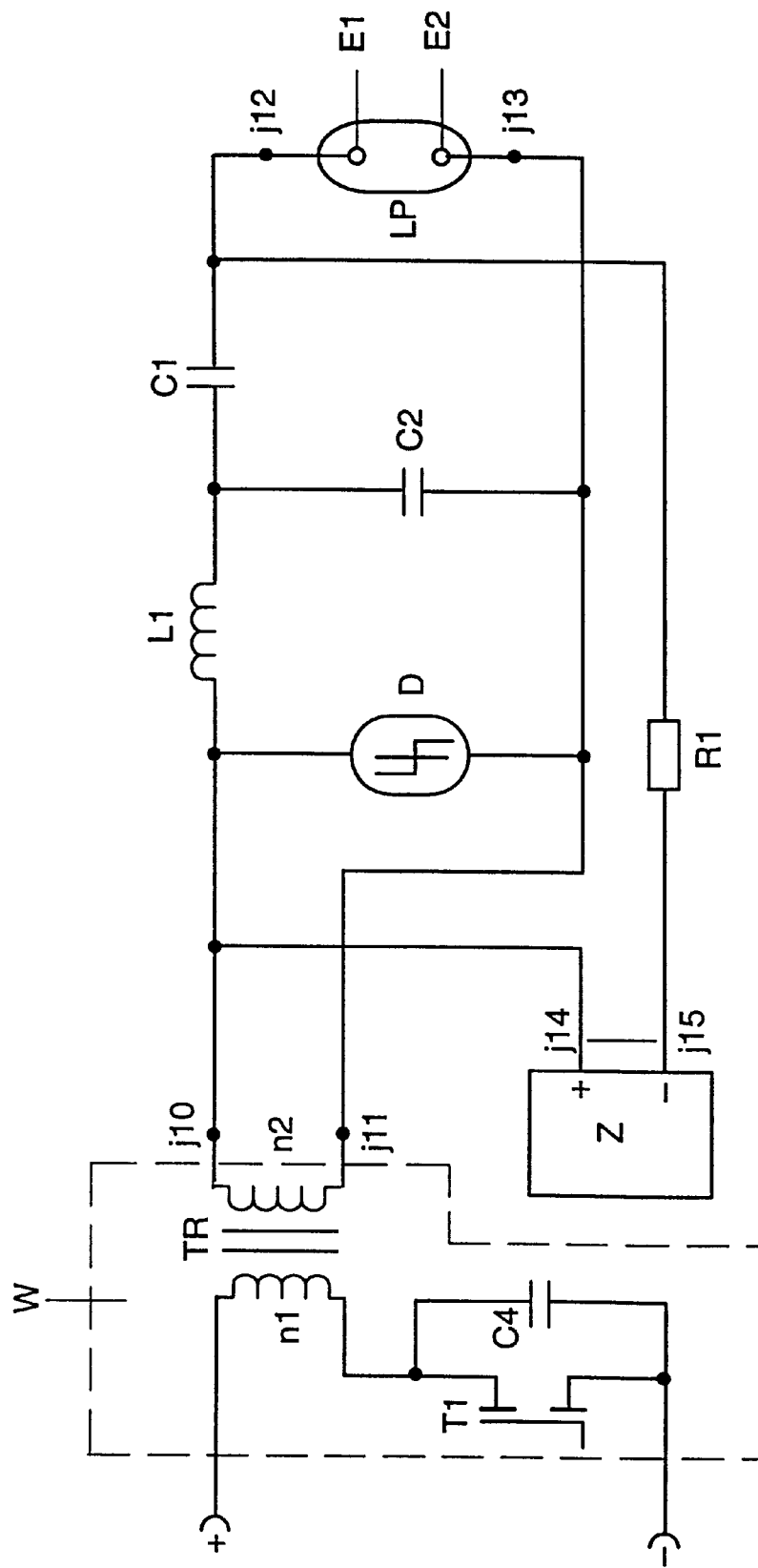

The invention will be explained in more detail below with reference to a preferred exemplary embodiment. In the drawings:

FIG. 1 shows a schematic illustration of the first exemplary embodiment of the circuit arrangement according to the invention FIG. 2 shows a schematic illustration of the second exemplary embodiment of the circuit arrangement according to the invention with a load circuit designed as a series resonant circuit FIG. 3 shows the circuit arrangement according to FIGS. 1 or 2 with a starter which has a secondary winding above the lamp inductor, in a schematic illustration FIG. 4 shows the circuit arrangement according to FIGS. 1 or 2 with a starter which has a cascade circuit for voltage multiplication, in a schematic illustration FIG. 5 shows the circuit arrangement according to FIG. 2 with a voltage converter designed as a single-ended converter operating resonantly, in a schematic illustration.

IV. DETAILED DESCRIPTION OF THE PREFERRED EMBODIMENTS

FIG. 1 shows a block diagram of the circuit arrangement according to the invention. It has a voltage converter W, which is fed by a voltage source, and, at its alternating voltage output j10, j11, provides a high-frequency alternating voltage for the high-frequency operation of a high-pressure discharge lamp LP. Connected to the alternating voltage output j10, j11 of the voltage converter W is a load circuit, which has a lamp inductor L1, a coupling capacitor C1, two terminals j12, j13 for a high-pressure discharge lamp LP and a bidirectional diode circuit D, which comprises, for example, two series-connected oppositely poled Zener diodes or a Transil diode D. When a high-pressure discharge lamp is connected, the two terminals j12, j13 are each connected to a lamp electrode E1 and E2, respectively. The lamp inductor L1, the coupling capacitor C1 and the discharge path between the lamp electrodes E1, E2 are then connected in series. The Transil diode D is arranged in parallel with the alternating voltage output j10, j11.

The circuit arrangement depicted in FIG. 1 also has a starter Z, which has a high-voltage source and a high-voltage DC output j14, j15. The high-voltage DC output j14, j15 is connected via a charging resistor R1 to the series circuit L1, C1 comprising the lamp inductor L1 and the coupling capacitor C1. For this purpose, according to FIG. 1, the positive terminal j14 of the high-voltage DC output is connected to the terminal j10 of the alternating voltage output from the voltage converter W, to the lamp inductor L1 and to the Transil diode D. The negative terminal j15 of the high-voltage DC output is connected via the charging resistor R1 to the coupling capacitor C1 and to the lamp terminal j12. The second lamp terminal j13 is connected to the terminal j11 of the alternating voltage output and to the Transil diode. The coupling capacitor has a capacitance of 1.1 nF, and the inductance of the lamp inductor is 45 $\mu$H.

From the low DC voltage of, for example, 12 V or 24 V or else 42 V present on its voltage input, the voltage converter W generates a high-frequency alternating voltage with an amplitude of about 500 V and a frequency above 500 kHz, and provides this at its alternating voltage output j10, j11 in order to operate the high-pressure discharge lamp LP. However, this alternating voltage is not sufficient to start the gas discharge in the high-pressure discharge lamp LP. The load circuit connected to the alternating voltage output j10, j11 of the voltage converter W is therefore initially interrupted between the two lamp electrodes E1, E2. The starter Z generates, on its high-voltage DC output j14, j15, a DC voltage of up to 25 kV, which is sufficient to start the gas discharge in the high-pressure discharge lamp LP. The coupling capacitor C1 is charged, via the charging resistor R1 and via the lamp inductor L1, to the high DC voltage generated by the starter Z. During the starting phase, it serves as a high-voltage source for the load circuit and, in particular, for the high-pressure discharge lamp LP. After the gas discharge in the high-pressure discharge lamp LP has been started, the discharge path between the two lamp electrodes E1, E2 becomes electrically conductive. The coupling capacitor C1 is then discharged via the now conductive discharge path of the high-pressure discharge lamp LP and, by this means, contributes to the formation and the stabilization of a discharge arc between the lamp electrodes E1, E2 and to shortening the warm-up phase of the high-pressure discharge lamp LP. In addition, after the gas discharge has been started, the load circuit is no longer interrupted, so that the high-frequency alternating voltage generated by the voltage converter W then permits a high-frequency alternating current to flow via the discharge path E1–E2 of the high-pressure discharge lamp LP. The Transil diode D serves as an overvoltage protection for the voltage converter W. If the voltage drop across the coupling capacitor C1 exceeds a critical threshold value, determined by the Transil diode D, the Transil diode D becomes conductive and the coupling capacitor C1 is primarily discharged via the Transil diode D instead of via the discharge path E1–E2 of the high-pressure discharge lamp LP.

FIG. 2 shows a block diagram of the circuit arrangement according to the invention with a load circuit designed as a series resonant circuit. This circuit arrangement differs from the circuit arrangement depicted in FIG. 1 only by an additional resonance capacitor C2 which, with the lamp inductor L1, forms a series resonant circuit and which is connected in parallel with the series circuit comprising the coupling capacitor C1 and the high-pressure discharge lamp LP. The capacitance of the resonance capacitor C2 is 80 pF. Because of the additional resonance capacitor C2, the operating method of the high-pressure discharge lamp LP on the circuit arrangement according to FIG. 2 differs slightly from the operating method of the high-pressure discharge lamp LP on the circuit arrangement according to FIG. 1. As soon as the voltage converter W provides a high-frequency alternating voltage at its alternating voltage output j10, j11, a high-frequency alternating current flows through the load circuit designed as a series resonant circuit, that is to say via the lamp inductor L1 and the resonance capacitor C2. In order to start the gas discharge in the high-pressure discharge lamp LP, the starter Z generates a high DC voltage at its DC output j14, j15 and charges the coupling capacitor C1, via the charging resistor R1, to a high DC voltage of up to 25 kV. During the starting phase, both the coupling capacitor C1 and the resonance capacitor C2 of the high-pressure discharge lamp LP serve as a voltage source. During the starting phase, the high DC voltage of the coupling capacitor C1 and the high-frequency alternating voltage of the resonance capacitor C2 are superimposed additively on the high-pressure discharge lamp LP. During the starting phase and during the warm-up phase of the high-pressure discharge lamp LP, the voltage converter W is preferably operated in such a way that it generates a high-frequency alternating voltage whose frequency is close to the resonant frequency of the series resonant circuit. As a result, a resonance-enhanced high-frequency alternating voltage is generated across the resonance capacity C2, which both improves the formation and stabilization of a discharge arc in the high-pressure discharge lamp LP and shortens the warm-up phase of the high-pressure discharge lamp LP—that is the operating phase directly after the gas discharge has been started, during which the ionizable filling components contributing to the light emission of the high-pressure discharge lamp evaporate. After the gas discharge has been started in the high-pressure discharge lamp LP, the coupling capacitor C1 is discharged via the then conductive discharge path E1–E2 of the lamp. At the end of the warm-up phase of the high-pressure discharge lamp LP, that is to say when all the filling components of the lamp LP have achieved their equilibrium partial pressure, the voltage converter W is controlled in such a way that it generates, on its alternating voltage output j10, j11, a high-frequency alternating voltage whose frequency has a sufficient distance from the resonant frequency of the series resonant circuit, so that resonance enhancement no longer occurs on the lamp inductor L1 and on the resonance capacitor C2. Here, too, the Transil diode D serves to protect the voltage converter W from voltage overload by the voltages present on the coupling capacitor C1 or on the resonance capacitor C2 during the starting phase.

FIGS. 3 and 4 depict two different embodiments of the starter Z, which can be used for both of the exemplary embodiments shown in FIGS. 1 and 2 of the circuit arrangement according to the invention, that is to say for a load circuit without and with a resonance capacitor C2. For this reason, the resonance capacitor C2 is in each case illustrated by dashed lines in FIGS. 3 and 4. The starter Z according to FIG. 3 comprises a secondary winding L2 coupled inductively to the lamp inductor L1, a rectifier diode D1 connected in series with the secondary winding L2 and a capacitor C3 arranged in parallel with the series circuit comprising secondary winding L2 and rectifier diode D1. The secondary winding L2 serves as a high-voltage source for the starter Z. When the voltage converter W is switched on, a high voltage is induced in the secondary winding L2 and is rectified by the diode D1. This rectified high voltage is fed to the coupling capacitor C1 via the resistor R1, as already explained above.

In FIG. 4, the starter Z is designed as a cascade circuit for voltage multiplication of the alternating voltage provided by the voltage converter W at its alternating voltage output j10, j11. The cascade circuit has, for example, twenty stages, of which only the first and the last are shown in FIG. 4, in order to convert the 500 V alternating voltage from the voltage converter W into a 20 kV DC voltage. The voltage input of the cascade circuit is connected to the alternating voltage output j10, j11 of the voltage converter W. The high-voltage output from the cascade circuit is connected via the charging resistor R1 to the coupling capacitor C1 and to the lamp terminal j12. The construction and functioning of a cascade circuit for voltage multiplication are described, for example, on page 220 of the book "Bauelemente der Elektronik und ihre Grundschaltungen" [Electronic components and their basic circuits] by H. Höger, F. Kähler and G. Weigt, published by H. Stam GmbH (7th edition).

In FIG. 5, the voltage converter W of the second exemplary embodiment (FIG. 2) is designed as a single-ended converter operating resonantly. The single-ended converter W has a field effect transistor T1, a transformer TR with a primary winding n1 and a secondary winding n2, and a drive device (not depicted) for the field effect transistor T1, as well as a capacitor C4. The primary winding n1 and the drain-source junction of the field effect transistor T1 are connected in series. The secondary winding n2 of the transformer TR is connected to the terminals j10, j11 of the alternating voltage output of the single-ended converter W. It serves as a high-frequency alternating voltage source for the load circuit. The gate electrode of the field effect transistor T1 is connected to the drive device. The capacitor C4 is arranged in parallel with the drain-source junction of the field effect transistor T1. The switching cycle of the field effect transistor T1 determines the frequency of the induced voltage generated in the secondary winding. During the starting phase and during the warm-up phase of the high-pressure discharge lamp LP, the field effect transistor T1 is driven, by means of the drive device, in such a way that the frequency of the induced voltage generated on the secondary winding n2 lies in the vicinity of the resonant frequency of the series resonant circuit C2, L1. As a result, during the abovementioned operating phases, a resonantly enhanced high-frequency alternating voltage occurs on the resonant-circuit components L1 and C2. The resonant frequency of the series resonant circuit L1, C2 is approximately 2.653 MHz, on the basis of the abovementioned dimensioning of these components. After the starting phase and the warm-up phase have been completed, the high-pressure discharge lamp LP is operated with a high-frequency alternating voltage of approximately 1 MHz. In order to avoid the occurrence of acoustic resonances in the discharge plasma, this operating frequency is modulated with a frequency of 100 kHz, so that the frequency of the lamp voltage is 0.9 MHz to 1.1 MHz. After the warm-up phase has been completed, the operating voltage of the high-pressure discharge lamp LP is about 80 V.

The high-pressure discharge lamp LP is a metal halide high-pressure discharge lamp with an electrical power consumption of approximately 35 watts, which is operated in a motor vehicle headlamp using the on-board voltage of the motor vehicle. In FIGS. 1 to 5, identical components have been provided with the same reference symbols.

The invention is not restricted to the exemplary embodiments explained in more detail above. For example, instead of a single-ended converter (FIG. 5), a push-pull converter, for example a push-pull inverter, can also be used, its alternating voltage output being formed by the secondary winding of a transformer.

What is claimed is:

1. A circuit arrangement for operating at least one high-pressure discharge lamp with a high-frequency alternating voltage, the circuit arrangement comprising:

a voltage converter (W) with an alternating voltage output (j10, j11), a load circuit which is connected to the alternating voltage output (j10, j11) and which has at least one lamp inductor (L1), a coupling capacitor (C1) and terminals for at least one high-pressure discharge lamp (LP), a starter (Z) with a high-voltage source and a high-voltage DC output (j14, j15) for starting a gas discharge in the at least one high-pressure discharge lamp (LP), wherein the coupling capacitor (C1) is connected to the high-voltage DC output (j14, j15) via a charging resistor (R1).

2. The circuit arrangement as claimed in claim 1, wherein the circuit arrangement is a circuit arrangement for the high-frequency operation of the at least one high-pressure discharge lamp (LP) with alternating voltage frequencies above 500 kHz.

3. The circuit arrangement as claimed in claim 1, wherein the high-voltage source is designed as a cascade circuit for voltage multiplication.

4. The circuit arrangement as claimed in claim 1, wherein the high-voltage source is designed as a secondary winding (L2) coupled inductively to the lamp inductor (L1).

5. The circuit arrangement as claimed in claim 4, wherein the starter (Z) has a rectifier diode (D1) connected in series with the secondary winding (L2) and a capacitor (C3) arranged in parallel with the series circuit comprising the secondary winding (L2) and the rectifier diode (D1).

6. The circuit arrangement as claimed in claim 1, wherein the load circuit additionally has at least one resonance capacitor (C2) which, with the lamp inductor (L1), forms a series resonant circuit.

7. The circuit arrangement as claimed in claim 6, wherein the resonance capacitor (C2) is connected in parallel with the series circuit comprising the coupling capacitor (C1) and the at least one high-pressure discharge lamp (LP).

8. The circuit arrangement as claimed in claim 1, wherein at least one voltage-limiting component (D) is connected in parallel with the alternating voltage output (j10, j11) of the voltage converter.

9. The circuit arrangement as claimed in claim 8, wherein the voltage-limiting component is a bidirectional diode (D) or a varistor.

10. The circuit arrangement as claimed in claim 1, wherein the voltage converter (W) is designed as a single-ended converter.

11. The circuit arrangement as claimed in claim 1, wherein the voltage converter (W) is designed as a push-pull converter.

12. A method of operating a high-pressure discharge lamp on a circuit arrangement as claimed in claim 1, in which
during the starting phase, the starter (Z) generates a high voltage for starting a gas discharge in the at least one high-pressure discharge lamp (LP),
the voltage converter (W) generates, at its alternating voltage output (j10, j11), a high-frequency alternating voltage which is sufficient to maintain the gas discharge in the high-pressure discharge lamp (LP),
wherein the high voltage generated by the starter (Z) is fed to the coupling capacitor (C1) and, during the starting phase, the coupling capacitor (C1) serves as a voltage source for the at least one high-pressure discharge lamp (LP).

13. The method as claimed in claim 12, wherein the voltage converter (W) generates a high-frequency alternating voltage of at least 500 kHz.

14. The method of operating a high-pressure discharge lamp as claimed in claim 12 on a circuit arrangement, in which the load circuit additionally has at least one resonance capacitor (C2) which, with the lamp inductor (L1), forms a series resonant circuit wherein, at least during the starting phase of the high-pressure discharge lamp (LP), the voltage converter (W) generates, at its alternating voltage output (j10, j11), a high-frequency alternating voltage such that a resonance-enhanced voltage drop is generated across the resonance capacitor (C2), the at least one high-pressure discharge lamp (LP) being fed with both the resonance-enhanced voltage from the resonance capacitor (C2) and the high DC voltage from the coupling capacitor (C1) in order to start a gas discharge.

* * * * *